(12) United States Patent
Chuang et al.

(10) Patent No.: US 7,863,966 B1
(45) Date of Patent: Jan. 4, 2011

(54) READOUT CIRCUIT FOR TOUCH PANEL

(75) Inventors: Kai-Lan Chuang, Tainan County (TW); Guo-Ming Lee, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 0 days.

(21) Appl. No.: 12/561,857

(22) Filed: Sep. 17, 2009

(51) Int. Cl.
  *H03K 17/96* (2006.01)
(52) U.S. Cl. ...................................................... 327/517
(58) Field of Classification Search ................. 327/509, 327/517
  See application file for complete search history.

(56) References Cited

U.S. PATENT DOCUMENTS 5,880,538 A * 3/1999 Schulz ....................... 307/109
6,362,632 B1 * 3/2002 Livingston .................. 324/661
7,782,068 B2 * 8/2010 Kuang ........................ 324/658

* cited by examiner

*Primary Examiner*—Jeffrey S Zweizig
(74) *Attorney, Agent, or Firm*—J.C. Patents

(57) ABSTRACT

A readout circuit for touch panel includes first and second switches, an operational amplifier (OP-AMP), a feedback capacitor, a comparison unit, and a counter. A first input terminal and an output terminal of the OP-AMP are respectively coupled to a second terminal of the first switch and an input terminal of the comparison unit. A second input terminal of the OP-AMP receives a reference voltage. Two terminals of the feedback capacitor and the second switch are respectively coupled to the first input terminal and the output terminal of the OP-AMP. The comparison unit selects first or second threshold voltages to compare with an output of the OP-AMP according to a output of the comparison unit. An input terminal of the counter receives the output of the comparison unit.

12 Claims, 4 Drawing Sheets

READOUT CIRCUIT FOR TOUCH PANEL

BACKGROUND OF THE INVENTION

1. Field of the Invention

The present invention relates to a touch panel, and more particularly, to a readout circuit which reads charge quantity of the touch panel.

2. Description of Related Art

With the blooming development in the electronic technology, and the prevalence of wireless communication and the Internet, a variety of electronic devices are becoming indispensable in people's day-to-day life and work. However, it is rather difficult to operate the most common input-output (I/O) interface, such as a keyboard or a mouse. Compared with a keyboard and a mouse, a touch panel is a simpler I/o interface. Therefore, the touch panel is usually applied as a man-machine interface between a man and an electronic device so as to perform some control operation.

Generally speaking, the touch panel can be classified into a resistive touch panel, an optical touch panel, and a capacitive touch panel, etc. On the other hand, the touch panel can also be classified into a current-type touch panel and a charge-type touch panel when being classified in a readout manner. FIG. 1 is a schematic diagram of an optical charge-type touch panel and a traditional readout circuit. A touch panel 110 includes a plurality of data lines and a plurality of scan lines which are respectively driven by a source driver 120 and a gate driver 130. A plurality of sensor lines of the touch panel 110 are coupled to a readout circuit 140. Only one scan line, one data line, and one sensor line are shown in FIG. 1.

A storage capacitor Cst1 and a liquid crystal capacitor Clc are respectively coupled to a bias voltage $V_{BIAS1}$ and a common voltage $V_{COM}$. The bias voltage $V_{BIAS1}$ and a common voltage $V_{COM}$ can be same or difference voltage(s). As the gate driver 130 turns on a switch SW1 via one of the scan lines, the source driver 120 correspondingly writes pixel data into the storage capacitor Cst1 and the liquid crystal capacitor Clc via one of the data lines. Since liquid crystal molecules in the liquid crystal capacitor Clc are correspondingly rotated due to a voltage difference between the pixel data and the common voltage $V_{COM}$, a corresponding gray-level of the pixel is displayed.

A photo transistor PT provides a discharging path between a storage capacitor Cst2 and a bias voltage $V_{BIAS2}$ according to the bias voltage $V_{BIAS2}$. Specifically, if a location of the photo transistor PT is not touched by a user, the photo transistor PT enhances a discharging speed of the storage capacitor Cst2 due to the external light irradiating. On the other hand, if the external light irradiating the photo transistor PT is diminished due to a user's touch, the photo transistor PT reduces the discharging speed of the storage capacitor Cst2. As the gate driver 130 turns on a readout switch SW2 via one of the scan lines, the readout circuit 140 reads the remained charge quantity of the storage capacitor Cst2 via one of the sensor lines, and simultaneously recharges the storage capacitor Cst2 to a normal rated voltage level.

The method that the readout circuit 140 detects the charge-type touch panel and determines the touch location mainly uses the inconsistent discharging of the storage capacitors Cst2 or whether a coupling capacitor exists or not. For the charge-type display panel 110, an integrator (i.e. an operational amplifier (OP-AMP) 141 and a feedback capacitor 142) is commonly disposed in the readout circuit 140 for detecting the charge difference of the touch panel 110. An analog-to-digital converter (ADC) 143 converts an integral result of the integrator into a corresponding digital code, and transmits the digital code to an image processing circuit 150, such that the image processing circuit 150 determines the touch location.

However, if the storage capacitor Cst2 or the coupling capacitor of the touch panel 110 is too large, a capacitance (area) of the feedback capacitor 142 must be increased in order to prevent an output saturation of the integrator. Furthermore, since each of the sensor lines needs one integrator, the area occupied by the readout circuit 140 is significantly large.

SUMMARY OF THE INVENTION

The present invention provides a readout circuit using an operational amplifier (OP-AMP) and a comparison unit to output an integral result such that a problem of too large feedback capacitor is solved. Besides, the present invention uses a counter to convert the integral result into a digital signal such that an analog-to-digital converter (ADC) is not required.

The present invention provides a readout circuit including a first switch, an OP-AMP, a feedback capacitor, a second switch, a comparison unit, a controller, and a counter. A first terminal of the first switch serves as an input terminal of the readout circuit. A first input terminal of the OP-AMP is coupled to a second terminal of the first switch, and a second input terminal of the OP-AMP receives a reference voltage. Two terminals of the feedback capacitor are respectively coupled to the first input terminal and an output terminal of the OP-AMP. Two terminals of the second switch are respectively coupled to the first input terminal and the output terminal of the OP-AMP. An input terminal of the comparison unit is coupled to the output terminal of the OP-AMP. The controller controls the comparison unit, the first switch and the second switch in accordance with an output of the comparison unit. If an output of the comparison unit is a first logic value, the controller controls the comparison unit to compares the output of the OP-AMP with a first threshold voltage, and if the output of the comparison unit is a second logic value, the controller controls the comparison unit to compares the output of the OP-AMP with a second threshold voltage. An input terminal of the counter receives the output of the comparison unit, and an output terminal of the counter serves as an output terminal of the readout circuit.

In an embodiment of the present invention, when the output of the comparison unit is the first logic value, the first switch is turned on and the second switch is turned off. In an embodiment of the present invention, when the output of the comparison unit is the second logic value, the first switch is turned off and the second switch is turned on.

In an embodiment of the present invention, the comparison unit includes a selector and a comparator. If the output of the comparison unit is the first logic value, the selector outputs the first threshold voltage. If the output of the comparison unit is the second logic value, the selector outputs the second threshold voltage. A first input terminal of the comparator is coupled to the output terminal of the OP-AMP, and a second input terminal of the comparator receives the output of the selector.

In an embodiment of the present invention, the first threshold voltage is greater than the second threshold voltage, the second threshold voltage is greater than the reference voltage, and the first threshold voltage is smaller than a system voltage.

In view of the above, the embodiment of the present invention uses the comparison unit to detect if the output of the integrator approaches to saturation. If the output of the integrator approaches to saturation, the integrator resets the feedback capacitor automatically and performs an integral operation again. The counter synchronously counts the number of times that the integrator approaches to saturation or the number of times that the integrator has been reset. Compared with a feedback capacitor of the traditional integrator, the integrator of the embodiment uses the smaller feedback capacitor to perform the integral operation, such that the problem of too large feedback capacitor in the traditional integrator is solved. Besides, the readout circuit of the embodiment uses a counter to convert the integral result into a digital signal, so that an ADC is not required.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The following description uses an optical charge-type touch panel as an example to illustrate the application of a readout circuit of the present invention. However, the embodiment is not intended to limit the present invention. The present invention may not only be applied to a charge-type touch panel, but also to a circuit or an electronic product that needs an integrator. People of ordinary skill in the art may implement a readout circuit of the present invention according to the spirits of the present invention and the suggestions and teaching of the following embodiments.

Figure 1:
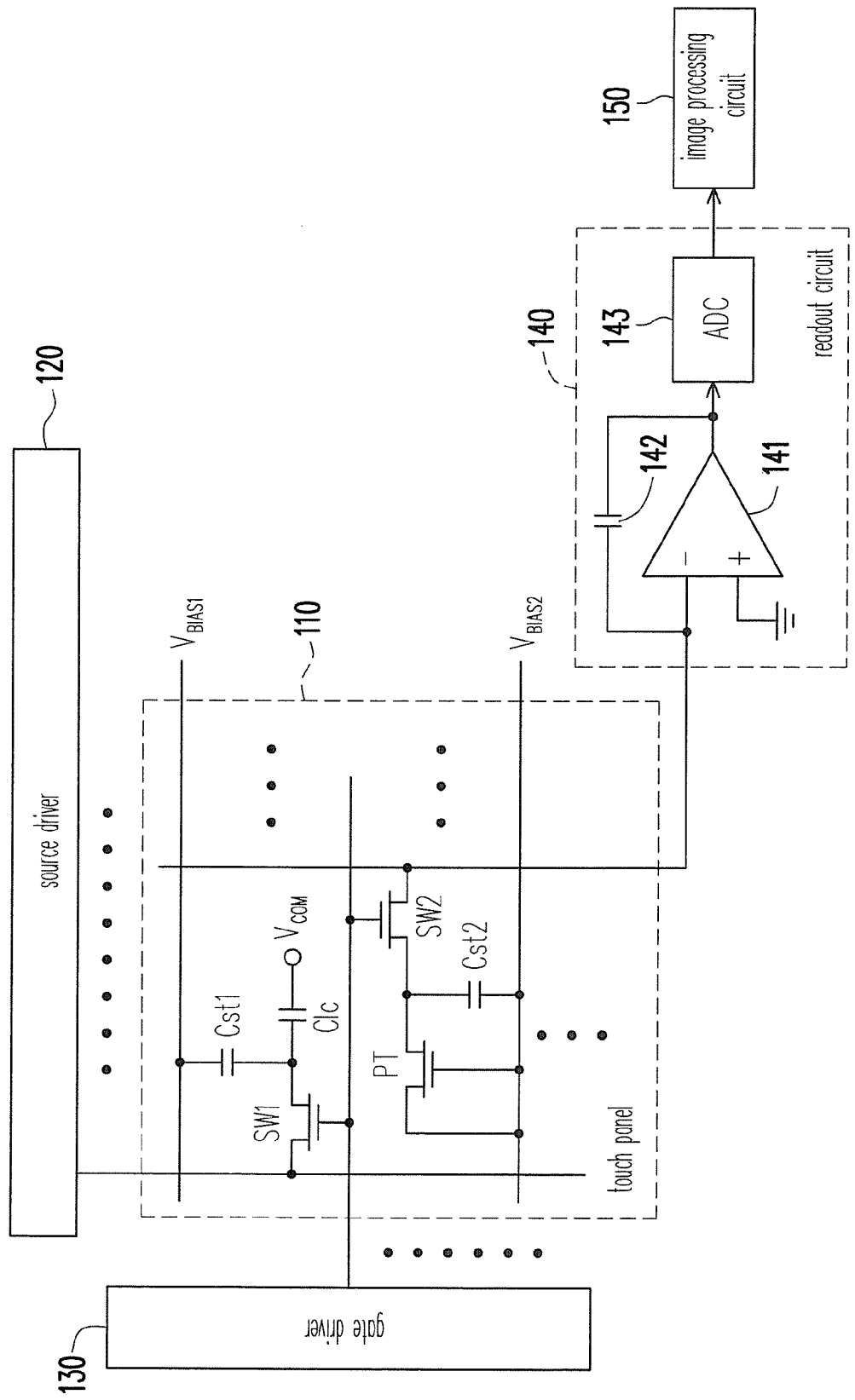
FIG. 1 is a schematic diagram of an optical charge-type touch panel and a traditional readout circuit.
Figure 2:
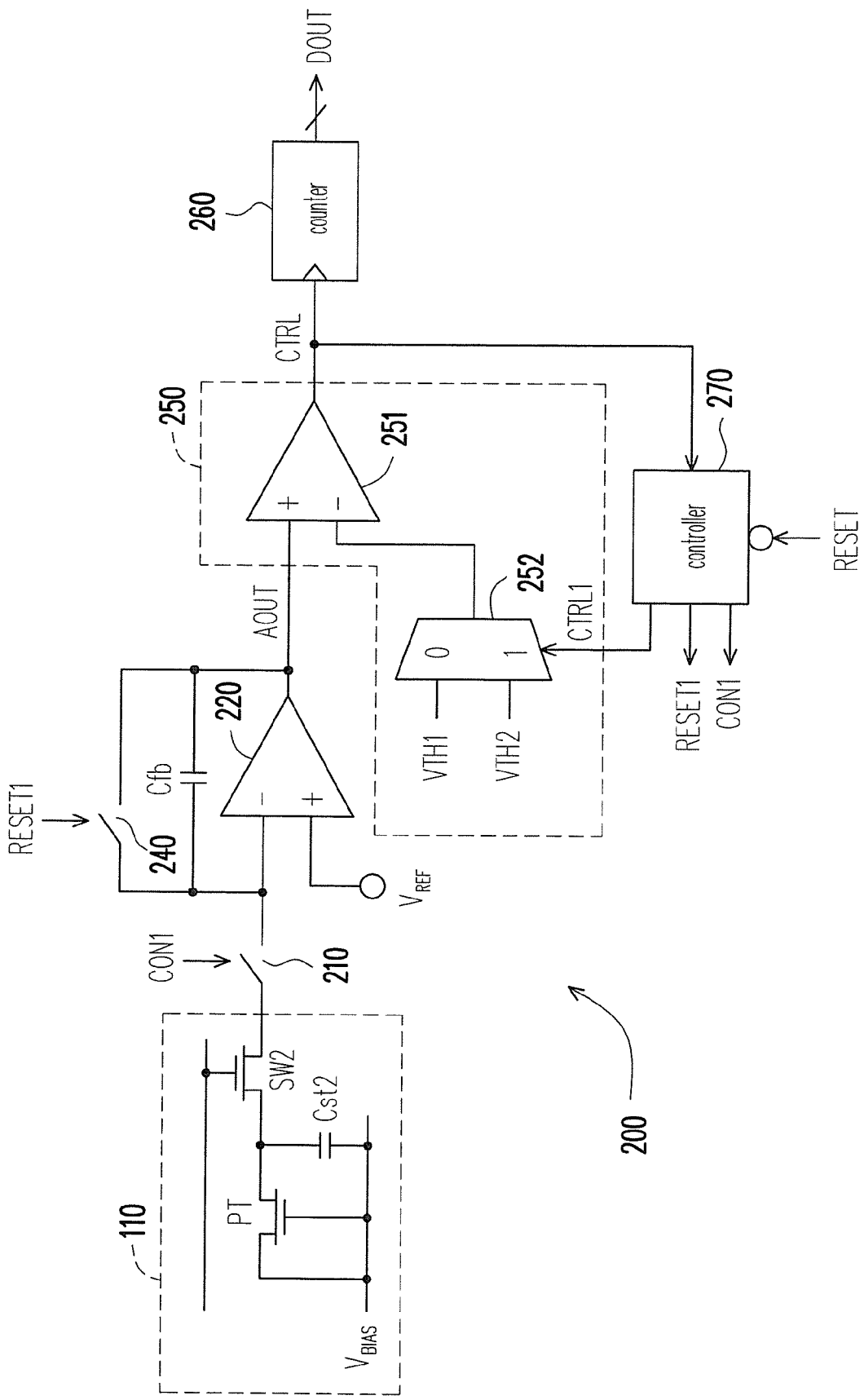
FIG. 2 is a circuit diagram of a readout circuit for touch panel in an embodiment of the present invention.

FIG. 2 is a circuit diagram of a readout circuit for touch panel in an embodiment of the present invention. A readout circuit 200 includes a first switch 210, an operational amplifier (OP-AMP) 220, a feedback capacitor Cfb, a second switch 240, a comparison unit 250, and a counter 260. The first switch 210, the second switch 240 and the comparison unit 250 are all controlled by a controller 270. The controller 270 initializes control signals CON1, RESET1 and CTRL1 according to a reset signal RESET, and generates the corresponding control signals CON1, RESET1 and CTRL1 according to an output CTRL outputted by the comparison unit 250.

A first terminal of the first switch 210 serves as an input terminal of the readout circuit 200. The input terminal of the readout circuit 200 is coupled to the readout switch SW2 of the optical charge-type touch panel 110. A second terminal of the first switch 210 is coupled to a first input terminal of the OP-AMP 220. The first switch 210 is controlled by the control signal CON1, such that whether the touch panel 110 is coupled to the OP-AMP 220 is determined. A second input terminal of the OP-AMP 220 receives a reference voltage $V_{REF}$. In the embodiment, the first input terminal of the OP-AMP 220 is an inverting input terminal, and the second input terminal of the OP-AMP 220 is a non-inverting input terminal. In addition, designers may design a level of the reference voltage $V_{REF}$ based on the design requirement. For example, the level of the reference voltage $V_{REF}$ may be set to a ground voltage, a band-gap voltage, +5V, or other fixed voltages. In the embodiment, the reference voltage $V_{REF}$ is set to half level of a system voltage VDDA (i.e. VDDA/2).

First terminals of the feedback capacitor Cfb and the second switch 240 are coupled to the first input terminal of the OP-AMP 220, and second terminals of the feedback capacitor Cfb and the second switch 240 are coupled to an output terminal of the OP-AMP 220. An input terminal of the comparison unit 250 is coupled to the output terminal of the OP-AMP 220. If the output CTRL of the comparison unit 250 is a first logic value (e.g. the logic value 0), the comparison unit 250 compares the output AOUT of the OP-AMP 220 with a first threshold voltage VTH1. If the output CTRL of the comparison unit 250 is a second logic value (e.g. the logic value 1), the comparison unit 250 compares the output AOUT of the OP-AMP 220 with a second threshold voltage VTH2. In the embodiment, the first threshold voltage VTH1 is greater than the second threshold voltage VTH2.

Figure 3:
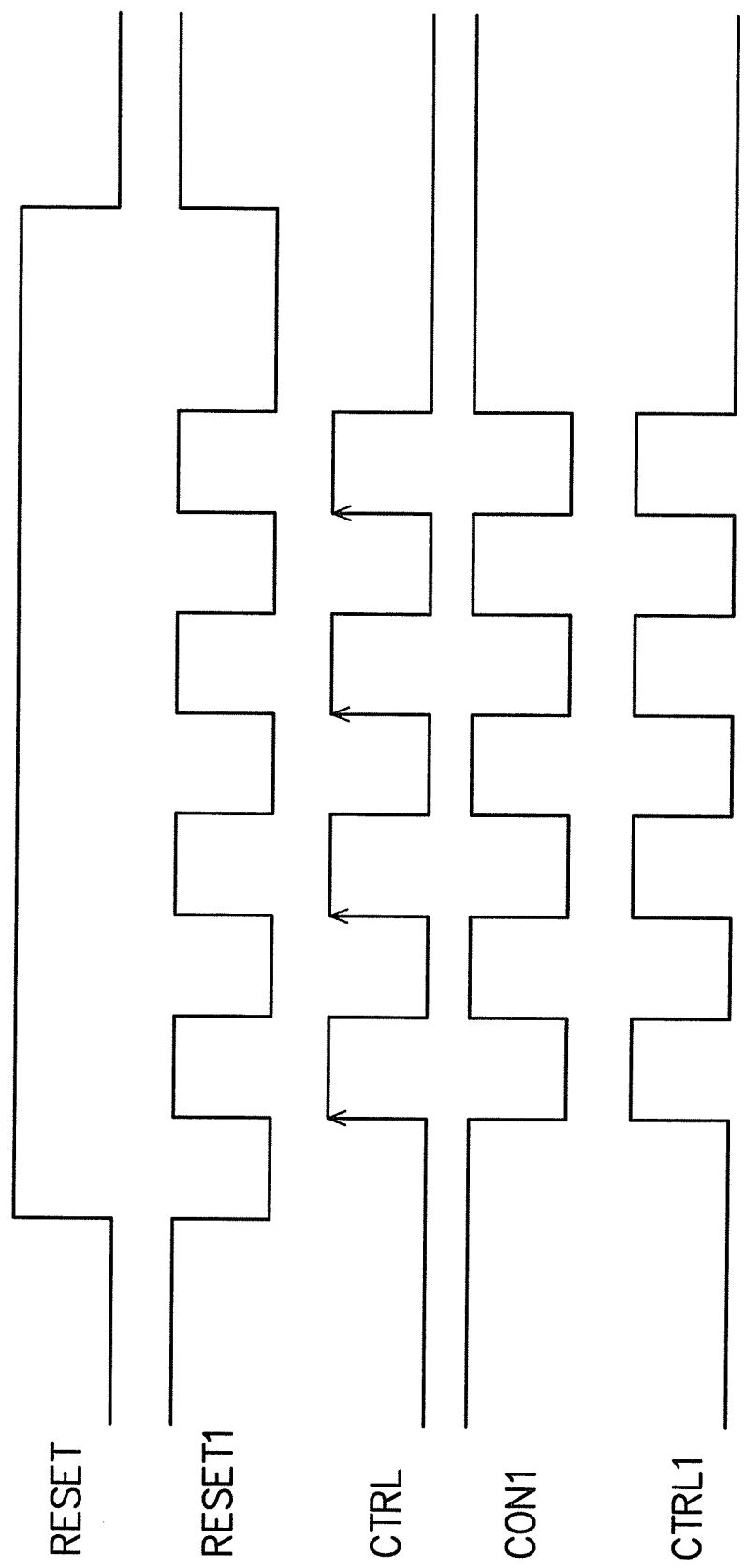
FIG. 3 shows a wave form of signals in FIG. 2 according to an embodiment of the present invention.
Figure 4:
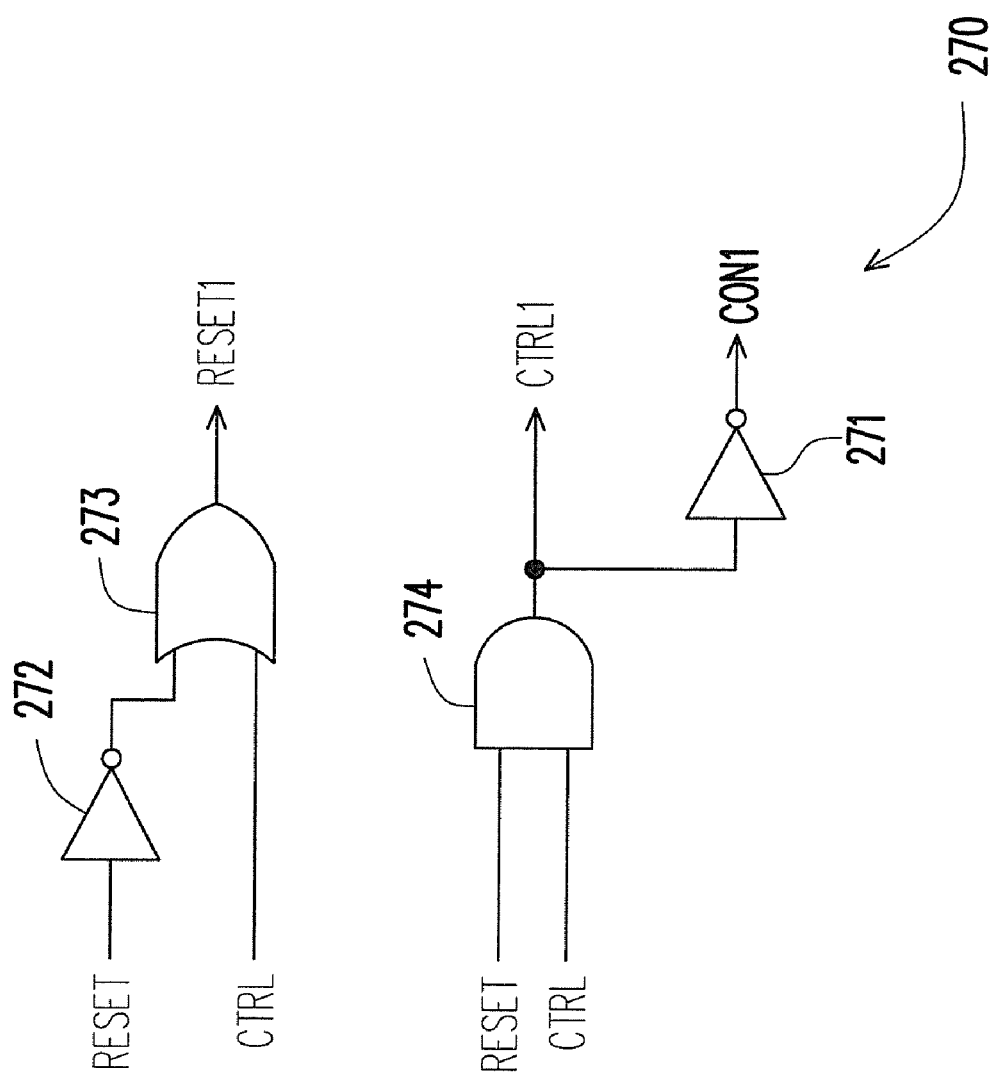
FIG. 4 shows an implementation of a controller in FIG. 2 according to an embodiment of the present invention.

FIG. 3 shows a wave foam of signals in FIG. 2 according to an embodiment of the present invention. When a system is during a power-on period or a reset period, the system sets the reset signal RESET to an "enable state", e.g. a logic-low level state. When the reset signal RESET is in the logic-low level state, the controller 270 initializes the readout circuit 200 via the control signals CON1, RESET1 and CTRL1 regardless of the output CTRL of the comparison unit 250. For example, the first switch 210 and the second switch 240 are turned on, and the comparison unit 250 compares the output AOUT of the OP-AMP 220 with the first threshold voltage VTH1 during the power-on period or the reset period.

When the reset signal RESET is in a "disable state" (e.g. a logic-high level state), the readout circuit 200 enters a normal operating mode. At this moment, the controller 270 generates the corresponding control signals CON1, RESET1 and CTRL1 according to the output CTRL outputted by the comparison unit 250. For example, if the output CTRL of the comparison unit 250 is the logic value "0", the controller 270 turns on the first switch 210 and turns off the second switch 240. Thus, the OP-AMP 220 is set to an integration configuration at this time. Besides, the comparison unit 250 compares the output AOUT of the OP-AMP 220 with the first threshold voltage VTH1. It is assumed that the first threshold voltage VTH1 is slightly lower than the system voltage VDDA, i.e. VTH1=VDDA−ΔV, wherein 0<ΔV<(VDDA−$V_{REF}$). For example, VTH1=VDDA−0.5V.

When the first switch 210 and the readout switch SW2 are turned on and the second switch 240 is turned off, the OP-AMP 220 and the feedback capacitor Cfb performs the integral operation and charges the storage capacitor Cst2 of the touch panel 110. Thus, the level of the output AOUT of the OP-AMP 220 correspondingly rises. The comparison unit 250 compares the output AOUT of the OP-AMP 220 with the first threshold voltage VTH1, such that whether the output AOUT of the OP-AMP 220 approaches to a saturation voltage (i.e. system voltage VDDA) is determined.

If the output AOUT of the OP-AMP 220 approaches to the saturation voltage, i.e. the output AOUT is greater than or equal to the first threshold voltage VTH1, the output CTRL of the comparison unit 250 is then the second logic value (e.g. logic value "1"). If the output CTRL of the comparison unit 250 is the logic value 1, the controller 270 turns off the first switch 210 and turns on the second switch 240. Thus, the OP-AMP 220 is set to a unit-gain configuration. Besides, the comparison unit 250 compares the output AOUT of the OP-AMP 220 with the second threshold voltage VTH2. It is assumed that the second threshold voltage VTH2 is slightly greater than the reference voltage $V_{REF}$, i.e. VTH2=$V_{REF}$+ $\Delta V$, wherein 0<$\Delta V$<(VDDA-$V_{REF}$). For example, VTH2=$V_{REF}$+0.5V.

Since the output AOUT of the OP-AMP 220 now approaches to the saturation voltage, the controller 270 automatically resets the feedback capacitor Cfb and the output AOUT of the OP-AMP 220. Thus, the level of the output AOUT of the OP-AMP 220 correspondingly falls. The comparison unit 250 compares the output AOUT of the OP-AMP 220 with the second threshold voltage VTH2, such that whether the output AOUT approaches to the reference voltage $V_{REF}$ is determined. If the output AOUT of the OP-AMP 220 has already approached to the reference voltage $V_{REF}$, which means the feedback capacitor Cfb and the output AOUT of the OP-AMP 220 has already been reset, then the output CTRL of the comparison unit 250 is changed to the logic value 0 again. Hence, the controller 270 make the readout circuit 200 perform the integral operation again. The integration mode and the reset mode mentioned-above alternately repeat again and again until the storage capacitor Cst2 of the touch panel 110 is charged to the normal rated voltage level. The operation of the controller 270 can be referred to Table 1, where X represents "don't care".

TABLE 1

Truth table of the controller 270

| RESET | CTRL | CON1 | RESET1 | CTRL1 |
|---|---|---|---|---|
| 0 | X | 1 | 1 | 0 |
| 1 | 0 | 1 | 0 | 0 |
| 1 | 1 | 0 | 1 | 1 |

An input terminal of the counter 260 receives the output CTRL (i.e. the compared results) of the comparison unit 250, and an output terminal of the counter 260 serves as an output terminal of the readout circuit 200. Since the counter 260 synchronously counts the number of times that the integrator (i.e. the OP-AMP 220 and the feedback capacitor Cfb) approaches to saturation or the number of times that the integrator has been reset, the integral result of the readout circuit 200 is obtained from the counting result DOUT output by the counter 260. In the embodiment, the counter 260 counts a rising edge of the output CTRL of the comparison unit 250.

Accordingly, although the storage capacitor Cst2 is larger than the feedback capacitor Cfb, the readout circuit 200 performs integrations for multi-times and reads the variation quantity of charges in the storage capacitor Cst2 until the voltage of the storage capacitor Cst2 is charged to reach the reference voltage $V_{REF}$, and the counter 260 counts the number of times of the integrations (or the number of times of resets), which is then used as the result of the variation quantity of charges in the storage capacitor Cst2. Thus, compared with the feedback capacitor of the traditional integrator, the readout circuit 200 of the embodiment uses the smaller feedback capacitor Cfb to perform the integral operation, such that the problem of too large feedback capacitor in the traditional integrator is solved. Besides, the readout circuit 200 of the embodiment uses the digital counting result DOUT output by the counter 260 as the integral result of the readout circuit 200, such that the analog-to-digital converter (ADC) in the readout circuit of the traditional touch panel is not required.

Those of the ordinary art in the field may realize the comparison unit 250 by any method according to the spirit and the teaching of the embodiment of the present invention as desired. For example, FIG. 2 is the comparison unit 250 of one of implementations according to the present invention. The comparison unit 250 includes a selector 252 and a comparator 251. A first input terminal of the selector 252 receives the first threshold voltage VTH1, and a second input terminal of the selector 252 receives the second threshold voltage VTH2. Besides, an output terminal of the selector 252 is coupled to a second input terminal of the comparator 251. The selector 252 outputs the first threshold voltage VTH1 or the second threshold voltage VTH2 into the comparator 251 according to the control signal CRTL1. If the output CTRL of the comparison unit 250 is the first logic value, the controller 270 controls the selector 252 via the control signal CRTL1, such that the selector 252 outputs the first threshold voltage VTH1 into the comparator 251. If the output CTRL of the comparison unit 250 is the second logic value, the selector 252 outputs the second threshold voltage VTH2 into the comparator 251 according to the control signal CRTL1. The first input terminal (e.g. a non-inverting input terminal) of the comparator 251 is coupled to the output terminal of the OP-AMP 220, and a second input terminal (e.g. an inverting input terminal) of the comparator receives the output of the selector 252.

Those of the ordinary art in the field may realize the controller 270 by any method according to the spirit and the teaching of the embodiment of the present invention as desired. For example, FIG. 3 shows an implementation of the controller 270 in FIG. 2 according to the embodiment of the present invention. The control circuit 270 includes a NOT gate 271, a NOT gate 272, an OR gate 273 and an AND gate 274. An input terminal of the NOT gate 272 receives the reset signal RESET of the system. A first input terminal of the OR gate 273 is coupled to an output terminal of the NOT gate 272, and a second input terminal of the OR gate 273 receives the output CTRL of the comparison unit 250. The OR gate 273 provides the control signal RESET1 via an output terminal of the OR gate 273 for the second switch 240. Two input terminals of the AND gate 274 respectively receive the reset signal RESET of the system and the output CTRL of the comparison unit 250, such that the control signal CTRL1 is provided via the output terminal of the AND gate 274 for the selector 252. A input terminal of the NOT gate 271 couples to the output terminal of the AND gate 274, such that the control signal CON1 is provided via the output terminal of the NOT gate 271 for the first switch 210.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A readout circuit for a touch panel comprising: a first switch having a first terminal serving as an input terminal of the readout circuit;

an operational amplifier (OP-AMP) having a first input terminal coupled to a second terminal of the first switch, having a second input terminal receiving a reference voltage;

a feedback capacitor having a first terminal coupled to the first input terminal of the OP-AMP, having a second terminal coupled to an output terminal of the OP-AMP;

a second switch having a first terminal couple to the first input terminal of the OP-AMP, having a second terminal coupled to the output terminal of the OP-AMP;

a comparison unit having an input terminal coupled to the output terminal of the OP-AMP;

a controller for controlling the comparison unit, the first switch and the second switch in accordance with an output of the comparison unit, wherein the controller controls the comparison unit for comparing the output of the OP-AMP with a first threshold voltage if the output of the comparison unit is a first logic value, and the controller controls the comparison unit for comparing the output of the OP-AMP with a second threshold voltage if the output of the comparison unit is a second logic value; and a counter having an input terminal receiving the output of the comparison unit, having an output terminal serving as an output terminal of the readout circuit.

2. The readout circuit of claim 1, wherein during a power-on period, the controller turns on the first switch and the second switch, and the controller controls the comparison unit for comparing the output of the OP-AMP with the first threshold voltage.

3. The readout circuit of claim 1, wherein during a reset period, the controller turns on the first switch and the second switch, and the controller controls the comparison unit for comparing the output of the OP-AMP with the first threshold voltage.

4. The readout circuit of claim 1, wherein when the output of the comparison unit is the first logic value, the controller turns on the first switch and turns off the second switch.

5. The readout circuit of claim 1, wherein when the output of the comparison unit is the second logic value, the controller turns off the first switch and turns on the second switch.

6. The readout circuit of claim 1, wherein the first input terminal of the OP-AMP is an inverting input terminal, and the second input terminal of the OP-AMP is a non-inverting input terminal.

7. The readout circuit of claim 1, wherein the comparison unit comprises:

a selector, wherein if the output of the comparison unit is the first logic value, the selector outputs the first threshold voltage, and if the output of the comparison unit is the second logic value, the selector outputs the second threshold voltage; and a comparator having a first input terminal coupled to the output terminal of the OP-AMP, having a second input terminal receiving the output of the selector.

8. The readout circuit of claim 7, wherein the first input terminal of the comparator is a non-inverting input terminal, and the second input terminal of the comparator is an inverting input terminal.

9. The readout circuit of claim 1, wherein the first threshold voltage is greater than the second threshold voltage.

10. The readout circuit of claim 1, wherein the second threshold voltage is greater than the reference voltage.

11. The readout circuit of claim 1, wherein the first threshold voltage is smaller than a system voltage.

12. The readout circuit of claim 1, wherein the counter counts a rising edge of the output of the comparison unit.

* * * * *